(12) United States Patent
Belser et al.

(10) Patent No.: US 9,734,515 B1
(45) Date of Patent: Aug. 15, 2017

(54) AD MANAGEMENT USING ADS CACHED ON A MOBILE ELECTRONIC DEVICE

(71) Applicant: Sprint Communications Company L.P., Overland Park, KS (US)

(72) Inventors: John E. Belser, Olathe, KS (US); Do Kyu Lee, Overland Park, KS (US); Hannah J. Sifuentes, Lee's Summit, MO (US); Anurag Thantharate, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/150,832

(22) Filed: Jan. 9, 2014

(51) Int. Cl.
*G06Q 30/00* (2012.01)
*G06Q 30/02* (2012.01)
*H04W 28/06* (2009.01)

(52) U.S. Cl.
CPC ........ *G06Q 30/0267* (2013.01); *H04W 28/06* (2013.01)

(58) Field of Classification Search
CPC .................................................. G06Q 30/0267
See application file for complete search history.

(56) References Cited

U.S. PATENT DOCUMENTS

| | | | |
|---|---|---|---|
| 5,636,346 A | 6/1997 | Saxe | |
| 5,761,648 A | 6/1998 | Golden et al. | |
| 5,848,396 A | 12/1998 | Gerace | |
| 5,848,397 A | 12/1998 | Marsh et al. | |
| 5,918,014 A | 6/1999 | Robinson | |
| 5,918,041 A | 6/1999 | Berstis | |
| 5,933,811 A | 8/1999 | Angles et al. | |
| 5,937,392 A | 8/1999 | Alberts | |
| 5,974,398 A | 10/1999 | Hanson et al. | |
| 6,202,023 B1 | 3/2001 | Hancock et al. | |
| 6,233,566 B1 | 5/2001 | Levine et al. | |
| 6,266,649 B1 | 7/2001 | Linden et al. | |
| 6,286,005 B1 | 9/2001 | Cannon | |

(Continued)

FOREIGN PATENT DOCUMENTS

| | | |
|---|---|---|
| WO | WO03044703 A1 | 5/2003 |
| WO | WO2012093396 A1 | 7/2012 |
| WO | WO2015038562 A1 | 3/2015 |

OTHER PUBLICATIONS

Thierer et al., "Privacy Solutions (Part 2): Adblock Plus", Technology Liberation Front, Sep. 8, 2008, on line at techliberation.com.*

(Continued)

*Primary Examiner* — Bennett Sigmond
*Assistant Examiner* — Scott C Anderson (57) ABSTRACT

A mobile communication device that replenishes and manages ads to display on an active application. The mobile communication device comprises a radio transceiver, a processor, a memory, a plurality of applications, stored in the memory, wherein each application comprises an ad client, and an ad manager, stored in the memory. The ad manager, when executed by the processor, requests a plurality of ads from an ad gateway associated with the network associated with the mobile communication device. The ad manager then receives a plurality of ads from the ad gateway. The ad manager then stores these ads into an ad cache, embedded within the memory of the mobile communication device. The ad manager receives a request from an ad client of one of the applications for an ad to display. The ad manager sends an ad selected from the ad cache to the ad client in the active application.

18 Claims, 7 Drawing Sheets

(56) References Cited

U.S. PATENT DOCUMENTS

| | | | |
|---|---|---|---|
| 6,317,722 B1 | 11/2001 | Jacobi et al. |
| 6,321,983 B1 | 11/2001 | Katayanagi et al. |
| 6,332,127 B1 | 12/2001 | Bandera et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |
| 6,963,867 B2 | 11/2005 | Ford et al. |
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,680,899 B1 | 3/2010 | Barnes et al. |
| 7,698,335 B1 | 4/2010 | Vronay |
| 7,788,644 B2 | 8/2010 | Koduru et al. |
| 7,801,518 B1 | 9/2010 | Urbanek |
| 7,840,498 B2 | 11/2010 | Frank et al. |
| 7,958,005 B2 | 6/2011 | Dangaltchev |
| 7,974,616 B1 | 7/2011 | Urbanek |
| 8,214,454 B1 | 7/2012 | Barnes et al. |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 8,509,821 B1 | 8/2013 | Zang et al. |
| 9,275,390 B1 | 3/2016 | Barnes et al. |
| 9,319,379 B1 | 4/2016 | Burcham et al. |
| 9,374,335 B2 | 6/2016 | Burcham et al. |
| 9,508,090 B1 | 11/2016 | Belser et al. |
| 9,590,938 B1 | 3/2017 | Burcham et al. |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1* | 11/2002 | Singh .............. G06F 17/30864 |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1* | 1/2003 | Ben-Zur et al. ............ 380/277 |
| 2003/0018516 A1 | 1/2003 | Ayala et al. |
| 2003/0018558 A1 | 1/2003 | Heffner et al. |
| 2003/0023482 A1 | 1/2003 | Messner et al. |
| 2003/0028451 A1 | 2/2003 | Ananian |
| 2003/0032409 A1 | 2/2003 | Hutcheson et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 | 7/2004 | Mears |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0080772 A1 | 4/2005 | Bem |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0215238 A1 | 9/2005 | Macaluso |
| 2005/0228754 A1 | 10/2005 | Pezzaniti et al. |
| 2005/0245246 A1 | 11/2005 | Munch et al. |
| 2005/0246394 A1 | 11/2005 | Neri |
| 2005/0254712 A1 | 11/2005 | Lindeman |
| 2005/0256759 A1 | 11/2005 | Acharya et al. |
| 2005/0278296 A1 | 12/2005 | Bostwick |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0173556 A1 | 8/2006 | Rosenberg |
| 2006/0178932 A1 | 8/2006 | Lang |
| 2006/0212350 A1* | 9/2006 | Ellis .................. G06Q 30/02 705/14.41 |
| 2006/0223495 A1 | 10/2006 | Cassett et al. |
| 2006/0224437 A1 | 10/2006 | Gupta et al. |
| 2006/0282316 A1* | 12/2006 | Snyder ........... G06Q 30/0267 705/14.64 |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2008/0004884 A1 | 1/2008 | Flake et al. |
| 2008/0010137 A1 | 1/2008 | Ho et al. |
| 2008/0040175 A1 | 2/2008 | Dellovo |
| 2008/0045245 A1 | 2/2008 | Billmaier et al. |
| 2008/0065476 A1 | 3/2008 | Klein et al. |
| 2008/0082412 A1 | 4/2008 | Tallyn et al. |
| 2008/0090599 A1 | 4/2008 | Patel et al. |
| 2008/0097851 A1 | 4/2008 | Bemmel et al. |
| 2008/0098420 A1* | 4/2008 | Khivesara ............ G06Q 30/02 725/32 |
| 2008/0104637 A1 | 5/2008 | Rodriguez et al. |
| 2008/0120565 A1 | 5/2008 | Stiso et al. |
| 2008/0126515 A1 | 5/2008 | Chambers et al. |
| 2008/0140476 A1 | 6/2008 | Anand et al. |
| 2008/0147478 A1 | 6/2008 | Mall et al. |
| 2008/0228583 A1 | 9/2008 | MacDonald et al. |
| 2009/0013051 A1* | 1/2009 | Renschler ........ G06F 17/30867 709/206 |
| 2009/0029721 A1* | 1/2009 | Doraswamy ........ G06Q 30/02 455/456.3 |

(56) References Cited

U.S. PATENT DOCUMENTS

| | | | |
|---|---|---|---|
| 2009/0048977 | A1* | 2/2009 | Aggarwal ......... G06F 17/30867 705/50 |
| 2009/0070129 | A1 | 3/2009 | Inbar et al. |
| 2009/0076899 | A1 | 3/2009 | Gbodimowo |
| 2009/0144139 | A1 | 6/2009 | Gaedcke |
| 2009/0150215 | A1 | 6/2009 | Kalb et al. |
| 2009/0157512 | A1 | 6/2009 | King |
| 2009/0198580 | A1* | 8/2009 | Broberg .................. G06Q 30/02 705/14.1 |
| 2009/0216683 | A1* | 8/2009 | Gutierrez ............... G06Q 30/02 705/80 |
| 2009/0222329 | A1 | 9/2009 | Ramer et al. |
| 2009/0256858 | A1 | 10/2009 | Ogikubo et al. |
| 2009/0265245 | A1 | 10/2009 | Wright |
| 2009/0271255 | A1* | 10/2009 | Utter et al. ...................... 705/14 |
| 2009/0292608 | A1* | 11/2009 | Polachek ........... G06Q 30/0245 705/14.44 |
| 2010/0082422 | A1 | 4/2010 | Heilig et al. |
| 2010/0082429 | A1 | 4/2010 | Samdadiya et al. |
| 2010/0119111 | A1 | 5/2010 | Helfman et al. |
| 2010/0222035 | A1* | 9/2010 | Robertson et al. ......... 455/414.1 |
| 2010/0228592 | A1 | 9/2010 | Anderson et al. |
| 2011/0082939 | A1* | 4/2011 | Montemurro et al. ....... 709/227 |
| 2011/0106622 | A1* | 5/2011 | Kuhlman ............... G06Q 30/02 705/14.53 |
| 2011/0131109 | A1 | 6/2011 | Pappas et al. |
| 2011/0246890 | A1 | 10/2011 | Mellamphy et al. |
| 2011/0258049 | A1 | 10/2011 | Ramer et al. |
| 2011/0270687 | A1 | 11/2011 | Bazaz |
| 2011/0288913 | A1 | 11/2011 | Waylonis et al. |
| 2011/0321167 | A1* | 12/2011 | Wu ..................... G06F 21/6245 726/26 |
| 2012/0072271 | A1 | 3/2012 | Dessert et al. |
| 2012/0123830 | A1 | 5/2012 | Svendsen et al. |
| 2012/0170521 | A1* | 7/2012 | Vogedes ................ H04W 4/001 370/329 |
| 2012/0179536 | A1 | 7/2012 | Kalb et al. |
| 2012/0215911 | A1 | 8/2012 | Raleigh et al. |
| 2013/0006743 | A1* | 1/2013 | Moore ................... G06Q 30/02 705/14.26 |
| 2013/0018714 | A1 | 1/2013 | George |
| 2013/0060631 | A1 | 3/2013 | Corson et al. |
| 2013/0115872 | A1 | 5/2013 | Huang et al. |
| 2013/0211925 | A1 | 8/2013 | Holland |
| 2013/0211941 | A1 | 8/2013 | Hallowell et al. |
| 2013/0304586 | A1 | 11/2013 | Angles et al. |
| 2013/0311293 | A1 | 11/2013 | Ward et al. |
| 2013/0331027 | A1 | 12/2013 | Rose et al. |
| 2014/0006129 | A1 | 1/2014 | Heath |
| 2014/0059141 | A1 | 2/2014 | Belkin et al. |
| 2014/0066029 | A1 | 3/2014 | Brennan et al. |
| 2014/0080467 | A1* | 3/2014 | Urbanek ................ H04W 8/20 455/418 |
| 2014/0089113 | A1 | 3/2014 | Desai et al. |
| 2014/0136314 | A1 | 5/2014 | Kiet et al. |
| 2014/0222569 | A1 | 8/2014 | Kerr |
| 2014/0235265 | A1 | 8/2014 | Slupik |
| 2014/0274031 | A1 | 9/2014 | Menendez |
| 2014/0278953 | A1 | 9/2014 | Ismail et al. |
| 2014/0379448 | A1 | 12/2014 | Gregory |
| 2014/0379467 | A1 | 12/2014 | Huang et al. |
| 2015/0074204 | A1 | 3/2015 | Burcham et al. |
| 2015/0121418 | A1 | 4/2015 | Jain et al. |
| 2015/0208199 | A1 | 7/2015 | Li et al. |
| 2015/0249914 | A1 | 9/2015 | Yu et al. |

OTHER PUBLICATIONS

Final Office Action dated Jun. 29, 2010, U.S. Appl. No. 11/558,021, filed Nov. 9, 2006, 28 pages.
Advisory Action dated Sep. 22, 2010, U.S. Appl. No. 11/558,021, filed Nov. 9, 2006, 3 pages.
Office Action dated Jun. 13, 2013, U.S. Appl. No. 11/558,021, filed Nov. 9, 2006.
Final Office Action dated Dec. 26, 2013, U.S. Appl. No. 11/558,021, filed Nov. 9, 2006.
Advisory Action dated Feb. 20, 2014, U.S. Appl. No. 11/558,021, filed Nov. 9, 2006, 3 pages.
Examiner's Answer date Aug. 26, 2014, U.S. Appl. No. 11/558,021, filed Nov. 9, 2006.
Office Action dated Aug. 30, 2010, U.S. Appl. No. 11/557,939, filed Nov. 8, 2006, 52 pages.
Final Office Action dated Jan. 13, 2011, U.S. Appl. No. 11/557,939, filed Nov. 8, 2006.
Advisory Action dated Mar. 22, 2011, U.S. Appl. No. 11/557,939, filed Nov. 8, 2006.
Office Action dated Oct. 31, 2013, U.S. Appl. No. 11/557,939, filed Nov. 8, 2006.
Office Action date Aug. 5, 2014, U.S. Appl. No. 11/557,939, filed Nov. 8, 2006.
Office Action dated Sep. 30, 2010, U.S. Appl. No. 11/617,703, filed Dec. 28, 2006.
Final Office Action dated Mar. 25, 2011, U.S. Appl. No. 11/617,703, filed Dec. 28, 2006.
Advisory Action dated Jun. 7, 2011, U.S. Appl. No. 11/617,703, filed Dec. 28, 2006.
Notice of Allowance dated Aug. 1, 2012, U.S. Appl. No. 11/617,703, filed Dec. 28, 2006.
Office Action dated Jul. 21, 2011, U.S. Appl. No. 12/259,187, filed Oct. 27, 2008.
Final Office Action dated Dec. 12, 2011, U.S. Appl. No. 12/259,187, filed Oct. 27, 2008.
Advisory Action dated Feb. 29, 2012, U.S. Appl. No. 12/259,187, filed Oct. 27, 2008.
Office Action dated Dec. 6, 2013, U.S. Appl. No. 12/259,187, filed Oct. 27, 2008.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Lightningcast, Inc., "Lightningcast Mobile Video Advertising Solution," May 2, 2005, 14 pgs.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Mechandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cyle Products", Operations Research, vol. 44, No. 1, Jan.-Feb. 1996, pp. 131-150, INFORMS.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Sterling, Greg, "Google Replacing "Android ID" with "Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developer.android.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?,"http://www.advertisingperspectives.com/adblog/media-activation/are-ad-exchanges-and-real-time-bidding-the-next-big-thing/, Apr. 3, 2014, last accessed Feb. 10, 2015.

(56) References Cited

OTHER PUBLICATIONS

Foreign Communication from a Related Counterpart—International Search Report and Written Opinion, dated Dec. 24, 2014, PCT/US14/54877, filed on Nov. 11, 2014.
Barnes, James D., et al., entitled, "Systems and Methods for State-Based Advertisement Messaging Across Media Types," filed May 22, 2006, U.S. Appl. No. 11/438,540.
Barnes, James D., et al., entitled, "In-Flight Campaign Optimization," filed Nov. 9, 2006, U.S. Appl. No. 11/558,021.
Barnes, James D., et al., entitled "Mobile-Device-Based Coupon Management Systems and Methods," filed Apr. 13, 2006, U.S. Appl. No. 11/403,614.
Barnes, James D., et al., entitled, "Inventory Management Integrating Subscriber and Targeting Data," Jun. 26, 2006, U.S. Appl. No. 11/474,880.
Barnes, James D., et al., entitled, "Behavioral Analysis Engine for Profiling Wireless Subscribers," filed Nov. 8, 2006, U.S. Appl. No. 11/557,939.
Barnes, James D., et al., entitled, "Advertisement Inventory Management," filed Oct. 27, 2008, U.S. Appl. No. 12/259,187.
Martin, Geoff S., et al., entitled, "Method and System for Providing Custom Background-Downloads," filed Nov. 16, 2007, U.S. Appl. No. 11/280,576.
McConnell, Von K. et al., entitled, "Method and System Using Location History for Targeted Coupon Distribution," filed May 17, 2000, U.S. Appl. No. 09/572,282.
Weaver, Farni, et al., "Method and System for Facilitating Determination of Call-Drop Locations in a Wireless Network," filed Sep. 9, 2003, U.S. Appl. No. 10/658,353.
Burcham, Robert H., et al., entitled "System and Method for Identifying a Mobile Device with Near Real Time Visualization to Action," filed Sep. 11, 2013, U.S. Appl. No. 14/024,627.
Burcham, Robert H., et al., entitled "System and Method to Generate an Abstract Advertisement Campaign Management and Implement Policy Enforcement," filed Sep. 11, 2013, U.S. Appl. No. 14/024,629.
Burcham, Robert H., et al., entitled "System and Method to Generate an Abstract Advertisement Campaign Management and Implement Policy Enforcement," filed Sep. 10, 2014, PCT Application Serial No. PCT/US2014/054877.
Burcham, Robert H., et al., entitled "Methods and Systems of Generating a Unique Mobile Device Identifier," filed Aug. 1, 2013, U.S. Appl. No. 13/956,367.
Holmes, Geoffrey A., entitled "Methods and Systems of Collecting and Segmenting Device Sensor Data for Mobile Device Identification," filed Jun. 5, 2013, U.S. Appl. No. 13/911,074.
Katzer, Robin D., et al., entitled "Advertisement Dynamic Queue Management," filed Apr. 10, 2014, U.S. Appl. No. 14/250,381.
Burcham, Robert H., et al., entitled "Categorization of Unknown Variables in a Target Information Database," filed Nov. 4, 2014, U.S. Appl. No. 14/532,969.
Bell, Timothy L., et al., entitled "Method for Consumer Profile Consolidation Using Mobile Network Identification," filed Oct. 20, 2014, U.S. Appl. No. 14/518,504.
Arivukkarasu, Anand, et al., entitled "Telecom Services to Support Retail Fuel Stocking Logistics," filed Nov. 12, 2014, U.S. Appl. No. 14/539,715.
Office Action—Restriction requirement dated Jun. 17, 2008, U.S. Appl. No. 11/405,195, filed Apr. 17 2006, 7 pages.
Office Action dated Aug. 15, 2008, U.S. Appl. No. 11/405,195, filed Apr. 17 2006, 12 pages.
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Final Office Action dated Oct. 27, 2010, U.S. Appl. No. 11/405,195, filed Apr. 17, 2006.
Office Action dated Feb. 8, 2011, U.S. Appl. No. 11/405,195, filed Apr. 17, 2006.
Final Office Action dated Jul. 22, 2011, U.S. Appl. No. 11/405,195, filed Apr. 17, 2006.
Advisory Action dated Oct. 14, 2011, U.S. Appl. No. 11/405,195, filed Apr. 17, 2006.
Office Action dated Apr. 6, 2012, U.S. Appl. No. 11/405,195, filed Apr. 17, 2006.
Notice of Allowance dated Dec. 6, 2012, U.S. Appl. No. 11/405,195, filed Apr. 17, 2006.
Office Action dated Feb. 27, 2009, U.S. Appl. No. 11/433,301, filed May 12, 2006, 13 pages.
Notice of Allowance dated Oct. 26, 2009, U.S. Appl. No. 11/433,301, filed May 12, 2006, 7 pages.
Notice of Allowance dated Mar. 5, 2012, U.S. Appl. No. 12/686,188, filed Jan. 12, 2010.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.
Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Final Office Action dated Nov. 8, 2010, U.S. Appl. No. 11/403,614, filed Apr. 13, 2006.
Office Action dated Dec. 3, 2012, U.S. Appl. No. 11/403,614, filed Apr. 13, 2006.
Final Office Action dated Jun. 10, 2013, U.S. Appl. No. 11/403,614, filed Apr. 13, 2006.
Advisory Action dated Aug. 22, 2013, U.S. Appl. No. 11/403,614, filed Apr. 13, 2006.
Office Action dated Nov. 3, 2008, U.S. Appl. No. 11/438,540, filed May 22, 2006, 14 pages.
Final Office Action dated Apr. 28, 2009, U.S. Appl. No. 11/438,540, filed May 22, 2006, 16 pages.
Advisory Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Final Office Action dated Apr. 20, 2010, U.S. Appl. No. 11/438,540, filed May 22, 2006, 26 pages.
Advisory Action dated Jul. 2, 2010, U.S. Appl. No. 11/438,540, filed May 22, 2006, 4 pages.
Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiner's Answer dated Oct. 27, 2011, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiner's Answer dated May 1, 2012, U.S. Appl. No. 11/474,880, filed Jun. 26, 2006.

(56) References Cited

OTHER PUBLICATIONS

Decision on Appeal dated Nov. 18, 2014, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Examiner's Answer dated Nov. 8, 2010, U.S. Appl. No. 11/491,387, filed Jul. 21, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Decision on Appeal dated Apr. 28, 2015, U.S. Appl. No. 11/438,540, filed May 22, 2006.
Office Action dated Feb. 25, 2015, U.S. Appl. No. 11/474,880, filed Jun. 26, 2006.
Final Office Action date Mar. 2, 2015, U.S. Appl. No. 11/557,939, filed Nov. 8, 2006.
Examiner's Answer dated Mar. 12, 2015, U.S. Appl. No. 12/259,187, filed Oct. 27, 2008.
Burcham, Robert H., et al., entitled "IP Address Hashing in Advertisement Gateway," filed Jan. 21, 2014, U.S. Appl. No. 14/160,196.
Burcham, Robert H., et al., entitled "Client Mediation and Integration to Advertisement Gateway," filed Jan. 21, 2014, U.S. Appl. No. 14/160,206.
Burcham, Robert H., et al., entitled "Address Modification for Advertisement Mediation," filed Jan. 21, 2014, U.S. Appl. No. 14/160,215.
Burcham, Robert H., et al., entitled "Advertisement Mediation of Supply-Demand Communications," filed Jan. 21, 2014, U.S. Appl. No. 14/160,224.
Delker, Jason R., et al., entitled, "Enhanced Dialer for a Mobile Communication Device," filed Mar. 4, 2015, U.S. Appl. No. 14/639,057.
Ferrante, Piero D., et al., entitled, "System and Method for Subscriber Cluster Synthesis," filed Feb. 11, 2015, U.S. Appl. No. 14/619,689.
Notice of Allowance dated Jul. 16, 2015, U.S. Appl. No. 11/438,540, filed May 22, 2006.
Final Office Action dated Aug. 31, 2015, U.S. Appl. No. 11/474,880, filed Jun. 26, 2006.
FAIPP Pre-Interview Communication dated Sep. 23, 2015, U.S. Appl. No. 13/956,367, filed Aug. 1, 2013.
FAIPP Pre-Interview Communication dated Sep. 18, 2015, U.S. Appl. No. 14/494,601, filed Sep. 24, 2014.
Wikipedia, "Foursuare," https://en.wikipedia.org/w/index.php?title=Foursquare&oldid=681836736, Mar. 2009, last accessed on Sep. 25, 2015.
Belser, John E., et al., entitled "End User Participation in Mobile Advertisement," filed Sep. 24, 2014, U.S. Appl. No. 14/494,601.
Advisory Action dated Oct. 29, 2015, U.S. Appl. No. 11/474,880, filed Jun. 26, 2006.
Supplemental Advisory Action dated Nov. 2, 2015, U.S. Appl. No. 11/474,880, filed Jun. 26, 2006.
Advisory Action date May 18, 2015, U.S. Appl. No. 11/557,939, filed Nov. 8, 2006.
Office Action date Dec. 17, 2015, U.S. Appl. No. 11/557,939, filed Nov. 8, 2006.
FAIPP Pre-Interview Communication dated Nov. 18, 2015, U.S. Appl. No. 14/024,629, filed Sep. 11, 2013.
Notice of Allowance dated Dec. 16, 2015, U.S. Appl. No. 13/956,367, filed Aug. 1, 2013.
First Action Interview Office Action dated Dec. 17, 2015, U.S. Appl. No. 14/494,601, filed Sep. 24, 2014.
Notice of Allowance dated Jan. 28, 2016, U.S. Appl. No. 14/024,629, filed Sep. 11, 2013.
FAIPP Pre-Interview Communication dated Apr. 15, 2016, U.S. Appl. No. 13/911,074, filed Jun. 5, 2013.
FAIPP Pre-Interview Communication dated Feb. 16, 2016, U.S. Appl. No. 14/245,822, filed Apr. 4, 2014.
Foreign Communication from a Related Counterpart—Preliminary Report on Patentability dated Mar. 24, 2016, PCT/US14/54877, filed Sep. 10, 2014.
Hannebaum, Ryan K., et al., entitled, "Advertisement Campaign Target Selection Engine," filed Apr. 4, 2014, U.S. Appl. No. 14/245,822.
Final Office Action dated May 3, 2016, U.S. Appl. No. 11/557,939, filed Nov. 8, 2006.
Restriction Requirement dated May 19, 2016, U.S. Appl. No. 14/024,627, filed Sep. 11, 2013.
First Action Interview Office Action dated Apr. 28, 2016, U.S. Appl. No. 14/245,822, filed Apr. 4, 2014.
Office Action dated Jul. 1, 2016, U.S. Appl. No. 14/165,569, filed Jan. 27, 2014.
Office Action dated Jul. 14, 2016, U.S. Appl. No. 14/165,571, filed Jan. 27, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Burcham, Robert H., et al., entitled "Swipe Screen Advertisement Metrics and Tracking," filed Nov. 27, 2013, U.S. Appl. No. 61/910,001.
Burcham, Robert H., et al., entitled "Swipe Screen Advertisement Metrics and Tracking," filed Jan. 27, 2014, U.S. Appl. No. 14/165,569.
Delker, Jason R., et al., entitled "Ad Management Using Ads Cached on a Mobile Electronic Device," filed Nov. 27, 2013, U.S. Appl. No. 61/910,002.
Delker, Jason R., et al., entitled "Ad Management Using Ads Cached on a Mobile Electronic Device," filed Jan. 27, 2014, U.S. Appl. No. 14/165,571.
FAIPP Pre-Interview Communication dated Sep. 9, 2016, U.S. Appl. No. 14/024,627, filed Sep. 11, 2013.
Notice of Allowance dated Oct. 24, 2016, U.S. Appl. No. 14/024,627, filed Sep. 11, 2013.
Barnes, James D., et al., entitled, "Behavioral Analysis Engine for Profiling Wireless Subscribers," filed Aug. 3, 2016, U.S. Appl. No. 15/227,950.
Examiner's Answer dated Nov. 2, 2016, U.S. Appl. No. 11/474,880, filed Jun. 26, 2006.
Decision on Appeal dated Apr. 14, 2017, U.S. Appl. No. 12/259,187 filed Oct. 27, 2008.
FAIPP Pre-Interview Communication dated May 9, 2017, U.S. Appl. No. 14/532,969, filed Nov. 4, 2014.

\* cited by examiner

AD MANAGEMENT USING ADS CACHED ON A MOBILE ELECTRONIC DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertisements are a beneficial way to promote companies and provide corporations that use advertisements financing that was not available before they used the advertisements. An ad presented on mobile device displays while the mobile device is browsing web sites or interacting with other applications may be referred to as an ad experience. Presenting ads on a mobile phone is an opportunity for wireless service providers to capture revenue from advertisers who will pay for ad experiences. Thus, ad experiences may be counted and reported by the mobile device to the wireless service provider in order for the provider to draw revenue from advertisers.

A wireless service provider may seek to achieve a balance between building many cell towers to provide greater radio bandwidth to mobile devices and building fewer cell towers to reduce costs. A determination of the appropriate concentration of cell towers may be made based on projected user wireless service consumption. Thus, where more users are accessing the radio access network, more cell towers may be built. The greater number of users who want more bandwidth, and the greater number of users paying service fees can defray the increased cost of infrastructure investment. The estimates of user demand may be inaccurate, and actual user demand may vary from the estimated demand. Additionally, user demand may be different at different times of year or for different reasons. Efficient use of the radio access network infrastructure is an ever present consideration in engineering the wireless network and wireless network communication services.

SUMMARY

In an embodiment, a mobile communication device is disclosed. The mobile communication device comprises a radio transceiver, a processor, a memory, a plurality of applications, stored in the memory, wherein each application comprises an ad client, and an ad manager stored in the memory. The ad manager, when executed by the processor, requests a plurality of ads from an ad gateway, receives a plurality of ads from the ad gateway, stores the ads in an ad cache embedded within the memory of the mobile communication device, receives a request from an ad client of one of the applications for an ad to display, and sends an ad selected from the ad cache to the ad client in the active application.

In an embodiment, a method of replenishing and managing ads to display on an active application on a mobile communication device is disclosed. The method comprises requesting an ad to display on the active application via an ad client embedded within the active application from an ad manager. The method further comprises requesting a plurality of ads by the ad manager from an ad gateway. The method further comprises receiving a plurality of ads by the ad manager from the ad gateway. The method further comprises storing the plurality of ads to an ad cache by the ad manager to the ad client embedded in the active application.

A method of replenishing, managing, and enabling display of ads on an active application on a mobile communication device is disclosed. The method comprises requesting an ad to display on the active application via an ad client embedded within the active application from the ad manager. The method further comprises requesting a plurality of ads by the ad manager from an ad gateway. The method further comprises receiving the plurality of ads by the ad manager from the ad gateway. The method further comprises storing the plurality of ads to an ad cache via the ad manager. The method further comprises transmitting an ad from the ad cache to the ad client in the active application via the ad manager. The method further comprises receiving a payload. The method further comprises the mobile communication device disabling presentation of ads by the active application in response to receiving the payload.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods that promote replenishing, managing, and enabling or disabling display of ads in a display associated with an active application of a mobile communication device. In an embodiment, the active application may request an ad to display from an ad manager via an ad client embedded within the active application. In an embodiment, the ad manager may attempt to obtain an ad from an ad cache maintained by the ad manager on the mobile communication device and to send the ad to the active application In an embodiment, if the ad cache is empty or contains stale ads (ads that have been viewed or experienced before or experienced more than a predefined number of times), the ad manager in the mobile communication device sends a request for a plurality of ads to an ad gateway. This may be accomplished when the active application sends a request for an ad to display to the ad manager via an ad client embedded within the active application. Alternatively, the ad manager may determine, independently of any ad request from an active application, that the ad cache is close to being empty or contains more than a predetermined number or a predetermined percentage of state ads and based on that determination the ad manager may send a request for a plurality of ads to the ad gateway. When the ad gateway receives the request, the ad gateway sends a plurality of ads to the ad manager. The ad manager stores the plurality of ads in the ad cache and sends an ad to the active application to fulfill its ad request.

The ad manager keeps tracks of ad experiences completed by the mobile communication device and transmits the information about the ad that was experienced to a server, for example a server operated by the wireless service provider. In an embodiment the ad manager keeps track of ads that are experienced and sends information to the profile data store, wherein the ad experience is the event of an ad being presented on a display of the mobile communication device. In an embodiment, the information in the profile data store contains information about a subscriber that uses the mobile communication device. The ad gateway may use the information to select ads that the subscriber has not viewed before and/or that the subscriber may be more likely to respond to.

The ad gateway may use information about the subscriber in the profile data store to select ads based on the demographics of the subscriber, based on an interest profile of the subscriber, and/or based on a purchase or ad click-through history of the subscriber. These ads may be referred to as targeted ads. The ad manager receives the plurality of ads and then stores them in an ad cache in the mobile communication device. The ad manager then selects an ad to send to the ad client, and the active application displays the ad.

In an embodiment, a service provider may wish to disable ads. To accomplish this, the service provider may utilize an open mobile alliance device management (OMA DM) structure. The network sends a message out to the mobile communication device, telling the mobile communication device that there is an OMA payload available to be downloaded. In an embodiment, an OMA client of the mobile communication device accesses an OMA server associated with the network and retrieves the OMA payload. The OMA payload comprises an OMA node that indicates that presentation of ads is to be disabled on the mobile communication device. In another embodiment, the service provider may send a message and/or a command to the ad manager that commands the ad manager to suppress the display of ads on the mobile communication device. In an embodiment, the mobile communication device may provide a selectable control to allow the subscriber to disable the display of ads. In an embodiment, the mobile communication device may be able to enable ads if ads are disabled to begin with. In each of these three cases, the ad manager may operate as a central point of control of ad display and control of the disablement of the display of ads.

The system comprising the ad manager, ad cache, ad gateway, profile data store, and ad data store ensures that ads will be readily available for active applications and will be replenished with ads as needed. In the past, the active application on a mobile communication device requested ads one at a time, usually by establishing three connections with the wireless network and then tearing down these three connections whenever an ad had been received. Radio access network overhead is consumed in both the set up and tear down of such connections. Frequent requests of ads, for example one ad request every 20 or so seconds, leads to excessive radio access network overhead, relative to the actual traffic of the ad content delivered, leading to less available bandwidth for subscribers to use. The system disclosed herein teaches reduced connection set up and tear down overhead on the radio access network relative to the actual traffic of ad content delivered (a plurality of ads are delivered for each connection set up and tear down cycle versus only one ad formerly). The system also promotes centralized control to disable presentation of ads in applications. Providing the ad manager locally on the mobile communication device rather than providing like functionality to a plurality of mobile communication devices from a remote application executing on a server computer coupled to a communication network may make design of the ad manager less complicated and more responsive to local applications.

Figure 1:
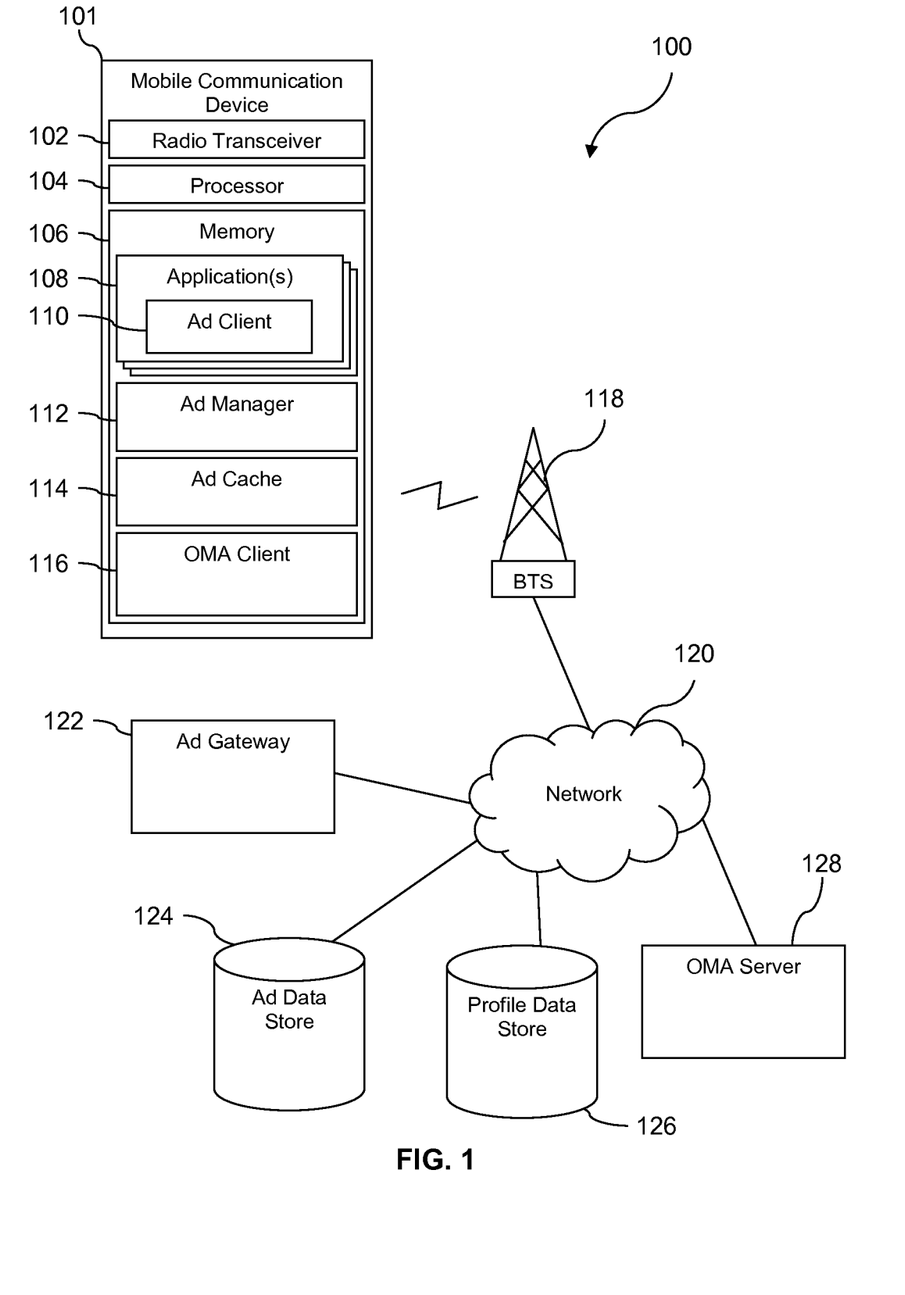
FIG. 1 is a block diagram of a system according to an embodiment of the disclosure.

Turning now to FIG. 1, a communication system 100 is described. In an embodiment, the system 100 comprises a mobile communication device 101. The mobile communication device 101 may comprise a radio transceiver 102, a processor 104, and a memory 106. The memory 106 of the mobile communication device 101 may further comprise a plurality of applications 108, wherein each application 108 comprises an ad client 110. The memory of the mobile communication device 101 may further comprise an ad manager 112, an ad cache 114, and an open mobile alliance (OMA) client 116. The ad client 110 monitors the usage of ads of the active application 108 and notifies the ad manager 112 when the active application 108 requests ads to display. The ad manager 112 facilitates the retrieval of advertisements to display on the mobile communication device 101. The ad cache 114 contains the ads that are available on the mobile communication device 101 for the active application 108 to display. The OMA client 116 is responsible for receiving an open mobile alliance device management (OMA DM) payload to enable or disable the presentation of advertisements on the active application 108 and to perform other known OMA DM activities. In an embodiment the mobile communication device 101 is one of a mobile phone, a smart phone, a laptop computer, a notebook computer, a tablet computer, a personal digital assistant (PDA), or a media player. In an embodiment, the mobile communication device 101 may be implemented as a handset. Details of handsets are discussed further hereinafter.

The system 100 may further comprise a base transceiver station (BTS) 118, and a network 120. The network 120 may be communicatively coupled to an ad gateway 122, an ad data store 124, a profile data store 126, and an OMA server 128. In an embodiment, the base transceiver station 118 may provide a wireless communication link to the mobile communication device 101 and communicatively couple it to the network 120. In an embodiment, the base transceiver station 118 may provide a wireless communication link to the mobile communication device 101 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol. While one mobile communication device 101 and one base transceiver station 118 are illustrated in FIG. 1, it is understood that the system 100 may comprise any number of mobile communication devices 101 and any number of base transceiver stations 118. The network 120 may be a public communication network, a private communication network, or a combination thereof. In an embodiment, the ad gateway 122 may receive a request from the ad manager 112 to retrieve a plurality of ads. The ad gateway 122 pulls a plurality of ads from the ad data store 124, and sends the plurality of ads back to the ad manager 112. In an embodiment, the ad gateway 122 may alternatively pull information from the profile data store 126 so it can select ads from the ad data store 124 that are germane to subscriber interests. Such ads may be referred to as targeted ads. In this embodiment, the ad gateway 1122 then sends a plurality of targeted ads to the ad manager 112 The OMA server 128 receives requests to send the OMA payload to the OMA client 116 to enable or disable the display of ads in the active application 108.

In an embodiment, the ad manager 112 is executed by the processor and receives a request from the ad client 110 for one or more ads to display on the active application 108. In an embodiment, the ad manager 112 may access the ad cache 114 to see if there are advertisements that can be provided to display in the active application 108. In an embodiment, the ad client 110 may be able to access the ad cache 114 directly and take advertisements to display in the active application 108. The ad manager 112 sends a request to the ad gateway 122 for a plurality of ads. The ad gateway 122 receives this request from the ad manager 112. In an embodiment the ad manager 112 may request a plurality of ads from the ad gateway 122 before it receives a request from the ad client 110 for an ad to display.

The ad gateway 122 selects a plurality of ads from the ad data store 124. In an embodiment, the ad gateway 122 may select at least twenty ads from the ad data store 124 to send to the ad manager 112. In an embodiment, the ad gateway 122 may select at least forty ads from the ad data store 124 to send to the ad manager 112. The ad gateway 122 transmits the plurality of ads to the ad manager 112. The ad manager 112 receives the ads from the ad gateway 122 and stores the ads into the ad cache 114. The ad manager 112 then sends an ad selected from the ad cache 114 to the ad client 110 in the active application 108. In an embodiment, the ad manager 112 transmits several ads at one time to the ad client 110 within the active application 108 and deletes ads that have not been experienced. In an embodiment, the ad manager 112 monitors the amount of ads on the active application 108 via the ad client 110 and is able to transmit ads via the ad cache 114 to the ad client 110 within the active application 108 when the active application 108 is close to running out of ads to display.

In an embodiment, the ad manager 112 monitors ad experiences, accumulates counts and/or other data about ad experiences, and sends an ad experience report to the profile data store 126 or to a server computer in the wireless service provider's network. The ad experience report may comprise counts of ad experiences and/or other data about ad experiences. The other data may comprise, for example, information about what application 108 was associated with an ad experience. The ad experience report may be transmitted by the mobile communication device 101 and/or the ad manager 112 periodically, for example once per day, once every two days, once per week, or at some other periodic interval. Alternatively, the ad experience report may be transmitted by the mobile communication device 101 and/or the ad manager 112 on an event, for example, in response to receiving a request to transmit the ad experience report or in response to the ad experience report exceeding a threshold size, for example exceeding 100 ad experiences or exceeding a predefined file size.

In an embodiment, the ad gateway 122 may alternatively pull information from the profile data store 126 which contains information about the subscriber to select ads from the ad data store 124 that are germane to subscriber interests. In an embodiment, the information in the profile data store 126 includes information about a subscriber that the ad gateway 122 may use to select ads e.g., targeted ads, that the subscriber is expected to be more responsive to. In an embodiment, the ad manager 112 keeps track of ad experiences completed by the mobile communication device 101 and transmits the information about the types of ads that were experienced to the profile data store 126, wherein an ad experience is the event of an ad being presented on the display of the mobile communication device 101. In an embodiment, the profile data store 126 may contain the information about an ad experience sent by the ad manager 112 and one or more of gender, ethnicity, age, financial status, educational level, and interests. In an embodiment, information may be drawn from ad experiences and the type of active application 108. For example, a subscriber using a cooking application may be interested in advertisements that have to do with cooking. In an embodiment, the profile data store 126 via the ad manager 112 keeps track of other applications 108 that are used on the mobile communication device 101, wherein the ad gateway 122 may select ads from the ad data store 124 that are germane to the other applications 108.

In an embodiment, the service provider may generate an OMA DM payload having an OMA node that indicates that ad presentation on a mobile device is to be disabled. The service provider may send a notification to the mobile communication device 101, for example via an SMS system message or via another message type, that an OMA DM payload is available for updating the device 101. The mobile communication device 101 may retrieve the OMA DM payload from an OMA DM server, and an OMA DM client on the mobile communication device 101 may process the OMA DM payload. The ad manager 112 may then respond to the OMD node indicating that ad presentation is to be disabled by disabling ad delivery to active applications 108 that request the ad or informing the active applications 108 that ad presentation is disabled. The present disclosure teaches a centralized disablement and enablement of ad presentation via the ad manager 112. By contrast, in known systems, it may be necessary to make a separate function or method call to a "disable ads" method for each application 108. Each "disable ads" method of each application 108 may have a different signature. It may be burdensome for a wireless service provider to keep up with all the different method signatures of different applications and to keep track of what applications are installed on what mobile communication devices 101. Providing a centralized ad enable/disable control via the ad manager 112 may significantly reduce the difficulty of enabling/disabling ad presentation by the wireless communication provider.

Figure 2:
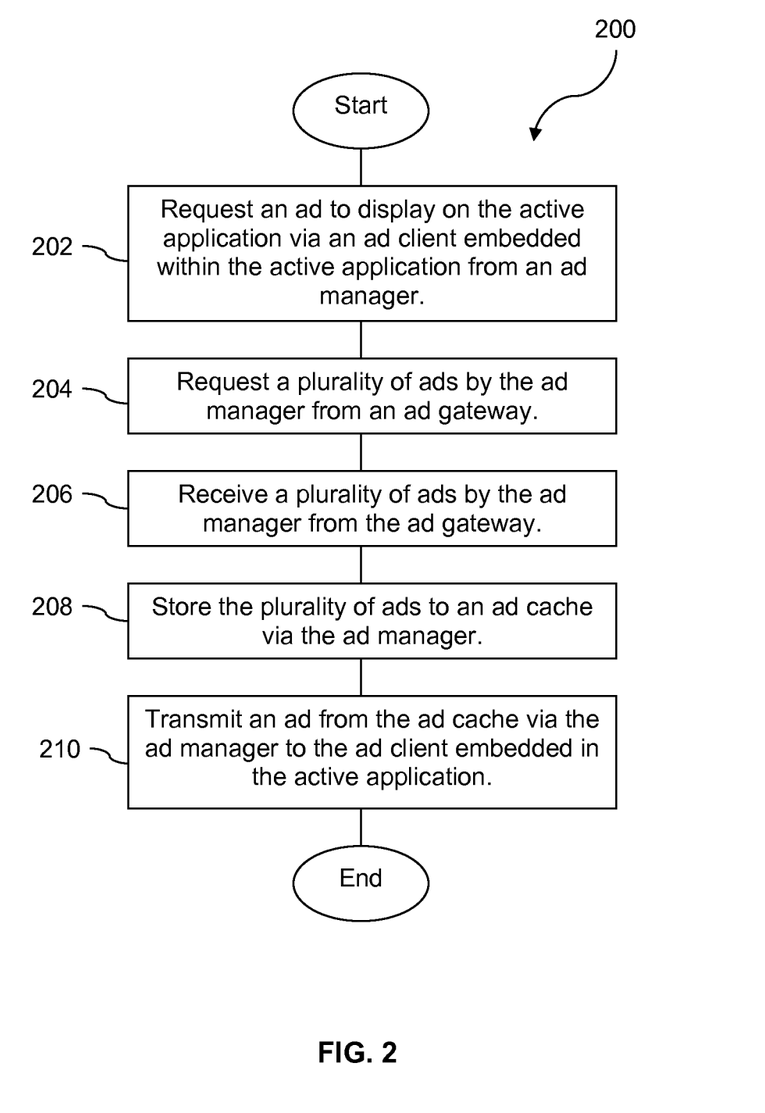
FIG. 2 is a flow chart of a method according to an embodiment of the disclosure.

In FIG. 2, a method 200 is described. At block 202, an ad client embedded within an active application requests an ad to display in the active application from an ad manager. At block 204, the ad manager requests a plurality of ads from an ad gateway. At block 206, the ad manager receives a plurality of ads from the ad gateway. At block 208, the ad manager stores the plurality of ads in an ad cache. At block 210, the ad manager transmits an ad from the ad cache via the ad manager to the ad client embedded in the active application, and the ad client presents the ad.

Figure 3:
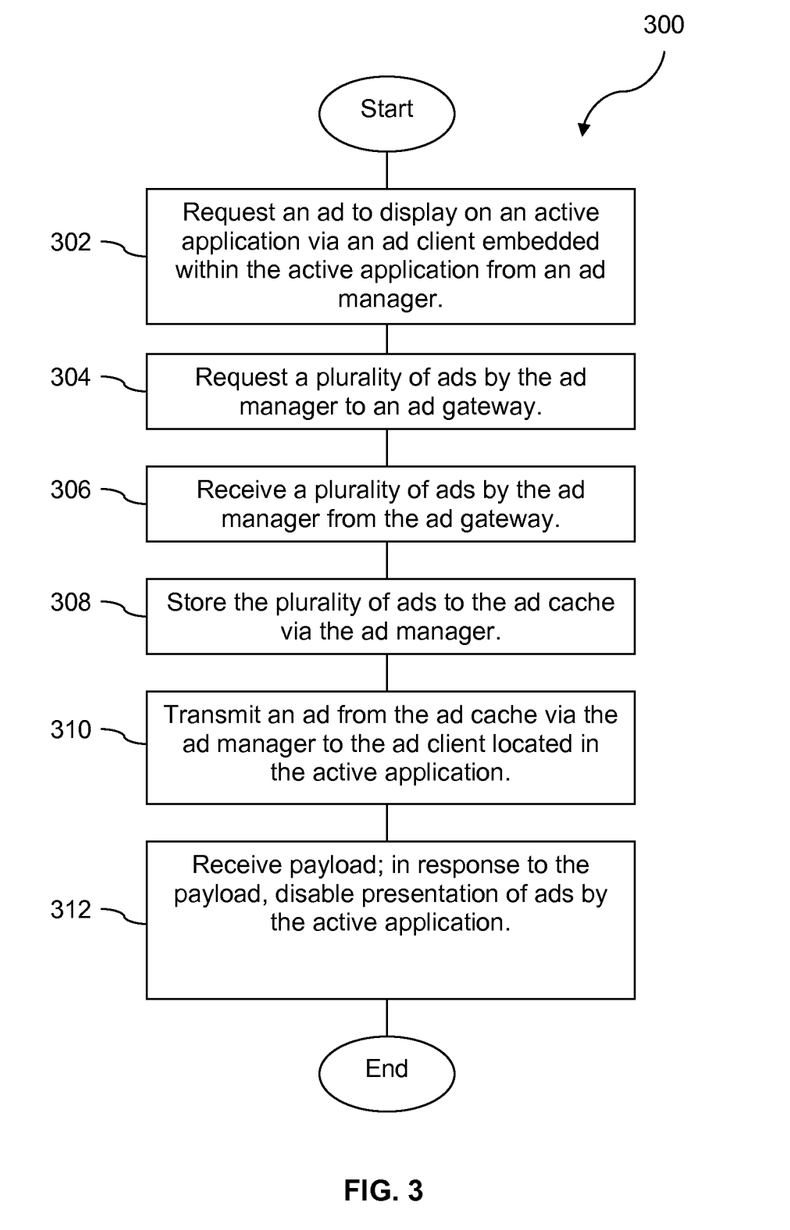
FIG. 3 is a flow chart of a method according to an embodiment of the disclosure.

In FIG. 3, a method 300 is described. At block 302, an ad client embedded within an active application requests an ad to display on the active application from an ad manager. At block 304, the ad manager requests a plurality of ads from an ad gateway. At block 306, the ad manager receives a plurality of ads from the ad gateway. At block 308, the ad manager stores the plurality of ads to an ad cache. At block 310, the ad manager transmits an ad from the ad cache via the ad manager to the ad client embedded in the active application. At block 312, the mobile communication device receives an open mobile alliance device management (OMA DM) payload; in response to receiving the OMA DM pay load, the mobile communication device disables presentation of ads by the active application.

Figure 4:
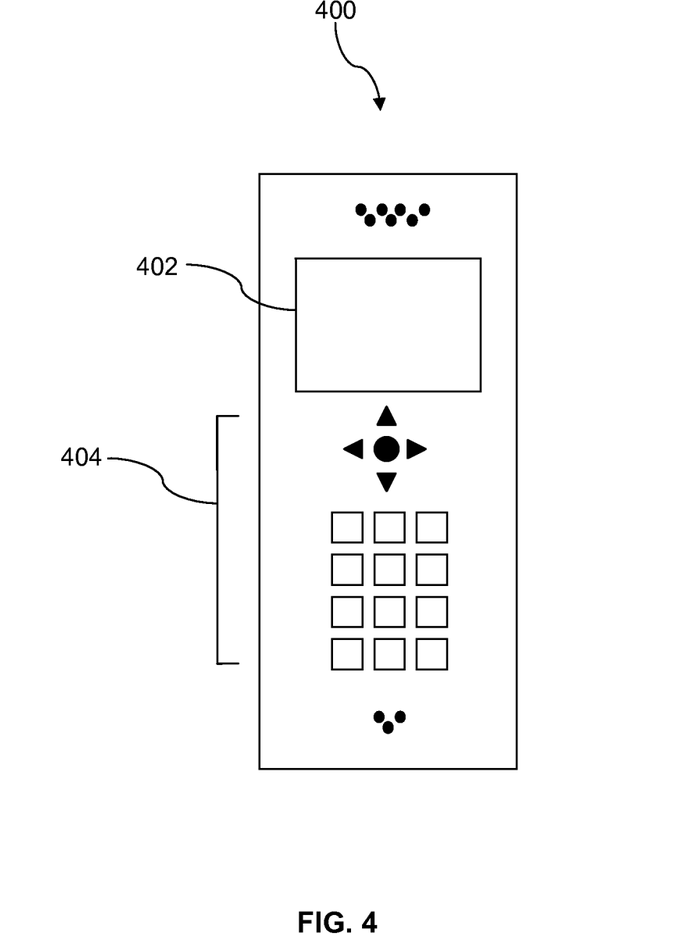
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
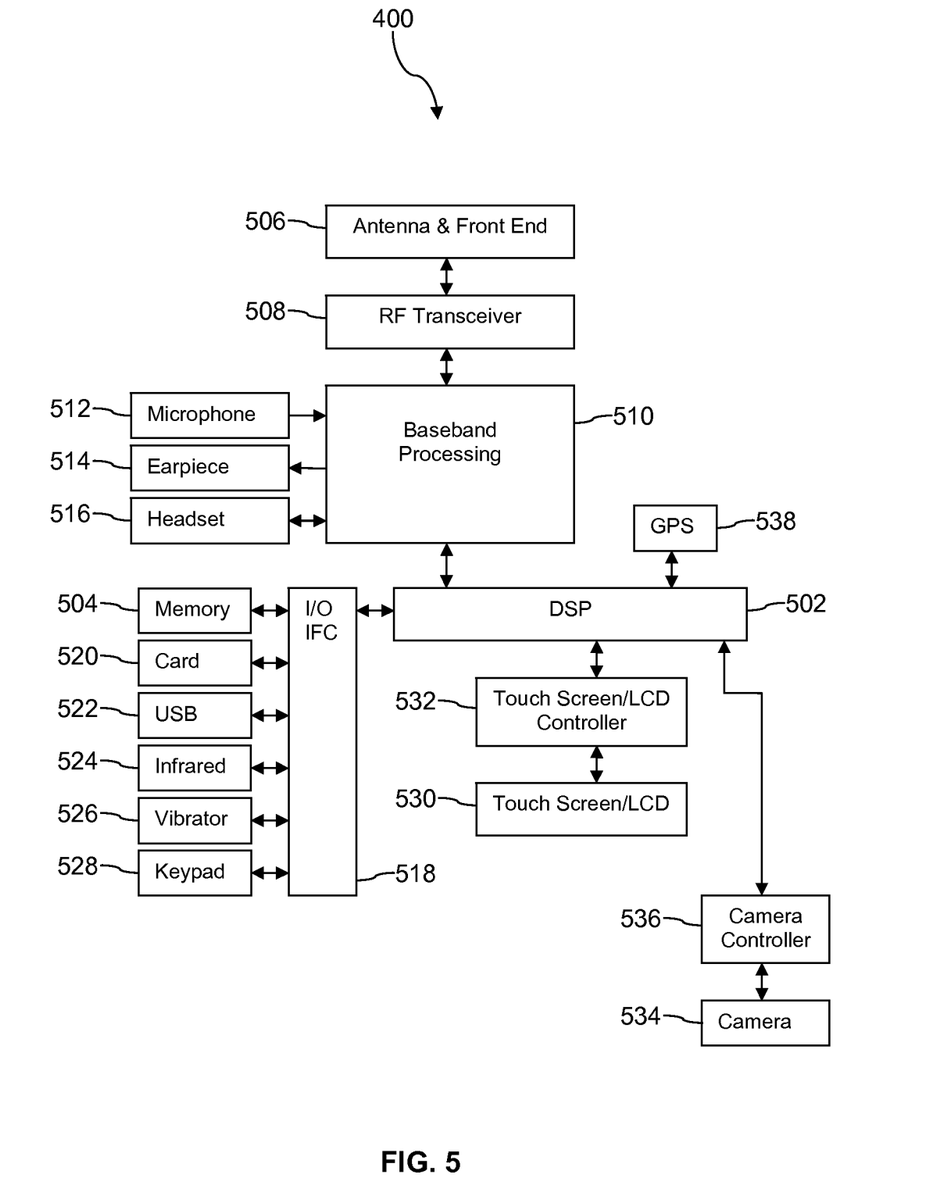
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
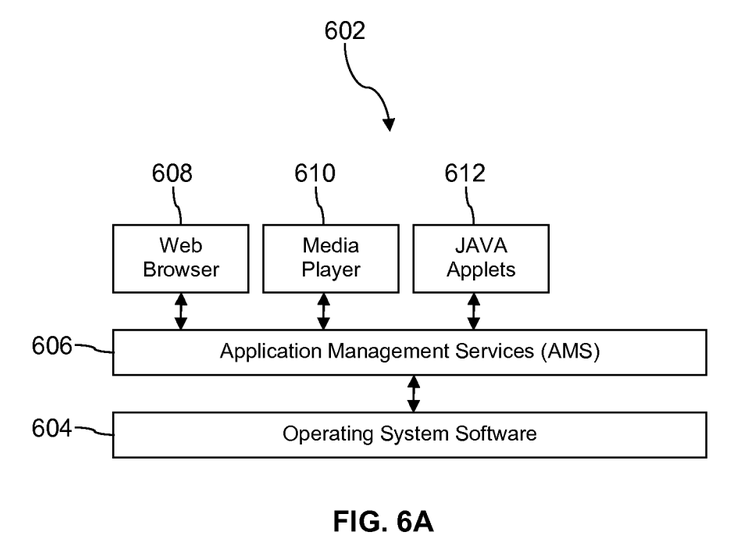
FIGS. 6A and 6B are block diagrams of software architecture for a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
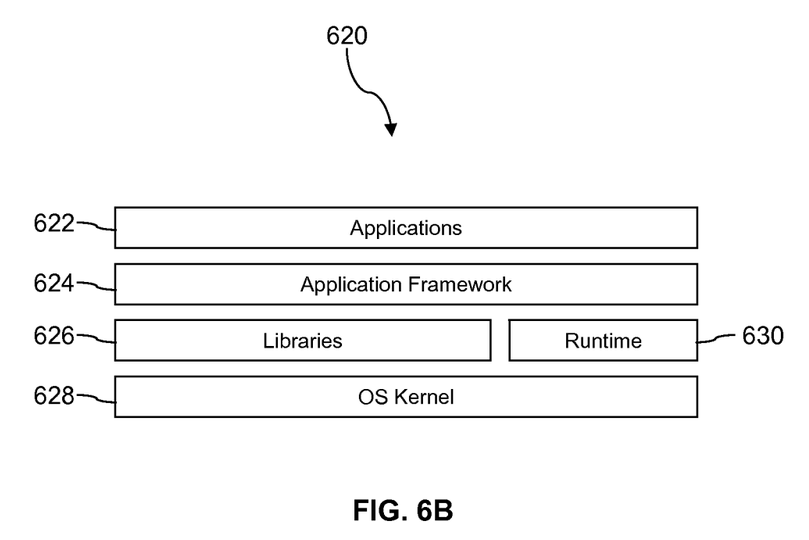

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
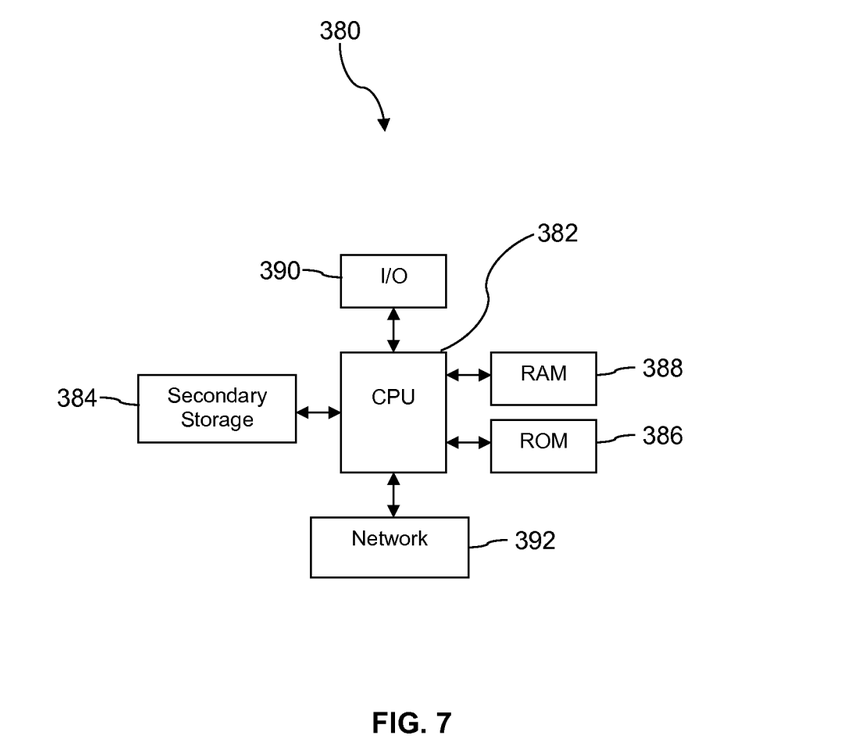
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device system that controls requests to an ad gateway for reducing network usage in the retrieval of ads, the system comprising:

a mobile communication device, comprising:
 a radio transceiver configured to communicatively couple with a network;
 a processor;
 a non-transitory memory in signal communication with the processor;
 a plurality of active applications stored in the non-transitory memory comprising a plurality of ad clients, wherein an ad client is embedded within each active application of the plurality of active applications; and
 an ad manager, stored in the non-transitory memory, that upon execution by the processor, configures the processor to:
  request a plurality of ads from an ad gateway external to the mobile communication device, the ad gateway facilitating communication between the ad manager on the mobile communication device and an ad data store external to the mobile communication device,
  receive the plurality of ads from the ad data store via the ad gateway, wherein the plurality of ads are obtained by the ad manager from the ad gateway instead of by each of the plurality of active applications on the mobile device individually establishing connections with the ad gateway to request one or more ads,
  store the plurality of ads in an ad cache of the non-transitory memory, and
  control delivery of one or more of the plurality of ads to the plurality of active applications on the mobile communication device by:
   in response to the plurality of ad clients monitoring the plurality of active applications, receive requests from the plurality of ad clients embedded within the plurality of active applications for an ad to display within an active application corresponding to a requesting ad client, and in response to each of the requests received from the plurality of ad clients embedded within the plurality of active applications, select at least one ad of the plurality of ads from the ad cache on the mobile communication device and send the at least one ad to the requesting ad client in the corresponding active application, wherein the requesting ad client presents the at least one ad within the corresponding active application, and wherein the ad manager is a central point of control to disable and enable display and presentation of the plurality of ads received from the ad data store via the ad gateway.

2. The system of claim 1, wherein the ad manager configures the processor to:

receive a payload from a wireless service provider via the radio transceiver, suppress display of ads, from at least the ad cache, in each of the plurality of active applications on the mobile communication device based on the payload, and track ad experiences completed by the mobile communication device, and transmit information of the ad experiences about the type of ad that was experienced to a profile data store via the radio transceiver, wherein an ad experience comprises the event of an ad being presented on a display of the mobile communication device.

3. The system of claim 2, wherein the profile data store comprises information about a subscriber profile stored in non-transitory memory at the wireless service provider, and wherein at least one of the plurality of ads received from the ad gateway is selected based on the subscriber profile and a likelihood that the ad results in an ad experience.

4. The system of claim 3, wherein the subscriber profile stored in the profile data store comprises the information about ad experience and at least one of gender, ethnicity, age, financial status, educational level, or interests that are associated with a subscriber corresponding to the subscriber profile.

5. The system of claim 1, wherein the mobile communication device comprises one of a mobile phone, a smart phone, a media player, a tablet computer, or a personal digital assistant.

6. The system of claim 1, wherein the ad manager further configures the processor to receive the requests from the plurality of ad clients after the ad manager stores the plurality of ads in the ad cache.

7. A computer implemented method on a mobile communication device for controlling requests to an ad gateway for reducing network usage in the retrieval of ads, the method comprising:

embedding, on a mobile communication device, an ad client within each of a plurality of active applications stored on the mobile communication device;

determining, by executing an ad manager stored in a non-transitory memory that configures at least one processor on the mobile communication device, that the ad client embedded within each of the plurality of active applications stored on the mobile communication device is requesting an ad to display in the plurality of active applications based on a plurality of ad clients that monitor the plurality of active applications, wherein each of the plurality of active applications comprises one of the plurality of ad clients;

requesting, by the ad manager via a network, a plurality of ads from an ad data store external to the mobile communication device via an ad gateway external to the mobile communication device, wherein the plurality of ads are obtained by the ad manager on the mobile communication device from the ad gateway instead of by each of the plurality of active applications on the mobile device individually establishing connections with the ad gateway via the network to request one or more ads;

receiving, by the ad manager via the network, the plurality of ads from the ad data store via the ad gateway in response to the requesting; storing, by the ad manager, the plurality of ads in an ad cache of the mobile communication device; and controlling, by the ad manager, retrieval of the plurality of ads from the ad gateway and delivery of one or more of the plurality of ads to the plurality of active applications by:

in response to determining that the plurality of ad clients embedded in the plurality of active applications are requesting an ad to display, selecting at least one ad from the ad cache to display within an active application corresponding to a requesting ad client, and in response to the ad clients requesting ads and the ad manager selecting the at least one ad from the ad cache, transmitting, by the ad manager, the at least one ad of the plurality of ads from the ad cache on the mobile communication device to the requesting ad client embedded in the corresponding active application, wherein the requesting ad client presents the at least one ad within the corresponding active application, and wherein the ad manager is a central point of control to disable and enable display and presentation of the plurality of ads received from the ad gateway.

8. The method of claim 7, wherein each ad client of the plurality of ad clients accesses the ad cache directly to retrieve ads.

9. The method of claim 7, wherein the number of ads the ad manager receives from the ad gateway is at least 20.

10. The method of claim 7, wherein the number of ads the ad manager receives from the ad gateway is at least 40.

11. The method of claim 7, further comprising: tracking, by the ad manager via the respective ad client, each active application corresponding to each ad client that is requesting an ad; and notifying, by the ad manager via the network, the ad gateway of which active application is requesting the ad via the respective ad client.

12. A computer implemented method on a mobile communication device for controlling requests to an ad gateway for reducing network usage in the retrieval of ads, comprising:

determining, by executing an ad manager stored in a non-transitory memory that configures at least one processor on a mobile communication device, that an ad client embedded within each of a plurality of active applications on the mobile communication device is requesting an ad to display on the plurality of active applications based on a plurality of ad clients monitoring the plurality of active applications;

requesting, by the ad manager on the mobile communication device via a network, a plurality of ads from an ad gateway external to the mobile communication device, wherein the plurality of ads are obtained by the ad manager on the mobile communication device from the ad gateway instead of by each of the plurality of active applications on the mobile device individually establishing connections via the network with the ad gateway to request one or more ads;

receiving, by the ad manager via the network, the plurality of ads from the ad gateway in response to the requesting;

storing the plurality of ads to an ad cache of the mobile communication device via the ad manager;

controlling, by the ad manager, retrieval of the plurality of ads from the ad gateway and delivery of one or more of the plurality of ads to the plurality of active applications from the ad cache by:

in response to determining that the plurality of ad clients embedded in the plurality of active applications are requesting an ad, selecting at least one ad of the plurality of ads from the ad cache to display within an active application corresponding to a requesting ad client; and in response to the ad clients requesting ads and the ad manager selecting the at least one ad, transmitting, by the ad manager, the at least one ad to the requesting ad client embedded in the corresponding active application based on the ad manager being a central point of control to disable and enable display and presentation of the plurality of ads received from the ad gateway, wherein the requesting ad client presents the at least one ad within the corresponding active application;

receiving, on the mobile communication device, a payload from a wireless service provider; and in response to receiving the payload, disabling, via the ad manager, presentation of any ads in each type of active application based on the payload.

13. The method of claim 12, wherein the payload is an open mobile alliance device management (OMA DM) payload, wherein the OMA DM payload is received by an OMA DM client stored within the non-transitory memory of the mobile communication device, and wherein the OMA DM payload comprises an OMA node that instructs the ad manager to disable presentation of ads on at least one of the plurality of active applications.

14. The method of claim 13, further comprising:

subsequent to disabling presentation of ads based on the payload, receiving a second payload on the mobile communication device from the wireless service provider; and in response to the second payload, enabling presentation of at least one ad in at least one of the plurality of active applications on the mobile communication device based on the second payload.

15. The method of claim 12, further comprising: selecting, by the ad manager, an ad from the ad cache that was previously presented in one of the plurality of active applications, and wherein the ad transmitted to the ad client in the one of the plurality of active applications is the previously presented ad.

16. The method of claim 12, wherein the ad manager transmits a plurality of ads at one time to the plurality of ad clients of the plurality of active applications.

17. The method of claim 12, wherein the ad manager monitors ad experiences and transmits an ad experience report one of every day, every two days, or every week.

18. The method of claim 12, wherein the mobile communication device is configured to communicate using a radio transceiver according to at least one of: a code division multiple access (CDMA) wireless protocol, a global system for mobile communications (GSM) wireless protocol, a long term evolution (LTE) wireless protocol, or a worldwide interoperability for microwave access (WiMAX) wireless protocol, or a wireless local area network communication protocol.

* * * * *